(12) United States Patent
Armand (10) Patent No.: US 11,577,173 B2
(45) Date of Patent: Feb. 14, 2023

(54) CONTROLLER SUPPORT FOR VIRTUAL REALITY VIDEO GAMES

(71) Applicant: PROTUBEVR, Marseilles (FR)

(72) Inventor: Romain Armand, Marseilles (FR)

(73) Assignee: PROTUBEVR, Marseilles (FR)

( * ) Notice: Subject to any disclaimer, the term of this patent is extended or adjusted under 35 U.S.C. 154(b) by 161 days.

(21) Appl. No.: 17/042,438

(22) PCT Filed: Mar. 26, 2019

(86) PCT No.: PCT/FR2019/050694
§ 371 (c)(1),
(2) Date: Sep. 28, 2020

(87) PCT Pub. No.: WO2019/186058
PCT Pub. Date: Oct. 3, 2019

(65) Prior Publication Data
US 2021/0077912 A1 Mar. 18, 2021

(30) Foreign Application Priority Data

Mar. 27, 2018 (FR) ...................................... 1852629

(51) Int. Cl.
*A63F 13/98* (2014.01)
(52) U.S. Cl.
CPC ...... *A63F 13/98* (2014.09); *A63F 2300/1043* (2013.01); *A63F 2300/8082* (2013.01)
(58) Field of Classification Search
None
See application file for complete search history.

(56) References Cited

U.S. PATENT DOCUMENTS

| 4,285,523 | A | * | 8/1981 | Lemelson | ............... | A63F 13/02 |
| | | | | | | 463/47 |
| 4,348,716 | A | | 9/1982 | Storm et al. | | |
| 4,909,514 | A | * | 3/1990 | Tano | ...................... | A63F 13/24 |
| | | | | | | 273/148 B |

(Continued)

FOREIGN PATENT DOCUMENTS

CN 106039714 A 10/2016

OTHER PUBLICATIONS

Universe Today, Tega Jessa, Sep. 19, 2010, https://web.archive.org/web/20100919180320/https://www.universetoday.com/73723/what-are-magnets-made-of/ , pp. 1-2 (Year: 2010).*

(Continued)

*Primary Examiner* — Tramar Harper
(74) *Attorney, Agent, or Firm* — Maier & Maier, PLLC (57) ABSTRACT

A controller support for virtual reality video games, where the support is presented in the form of a stick simulating an object in the virtual reality video game, at least one housing is adapted to receive a controller by interlocking, the controller housing is secured to the stick by way of a pin, the controller housing is grippable and configured to be removably engaged on the pin, a magnetic connection exerting a magnetic force ensures the holding in position of the controller housing on the pin, the magnetic connection is configured such that the engagement/disengagement of the controller housing on the pin is done by a lateral movement of said housing, the magnetic force being oriented in the direction of this lateral movement.

19 Claims, 6 Drawing Sheets

(56) References Cited

U.S. PATENT DOCUMENTS

| | | | | |
|---|---|---|---|---|
| 6,688,571 | B1* | 2/2004 | Pauls | A61G 5/10 |
| | | | | 248/282.1 |
| 8,550,915 | B2* | 10/2013 | Ashida | A63F 13/02 |
| | | | | 345/161 |
| 8,568,233 | B2* | 10/2013 | Block | A63F 13/98 |
| | | | | 463/47 |
| 10,744,406 | B2* | 8/2020 | Ham | G06F 3/033 |
| 2004/0180719 | A1* | 9/2004 | Feldman | A63B 24/00 |
| | | | | 463/36 |
| 2008/0214306 | A1* | 9/2008 | Ludden | A63F 13/06 |
| | | | | 463/37 |
| 2009/0149255 | A1* | 6/2009 | Fu | A63F 13/02 |
| | | | | 463/36 |
| 2011/0190056 | A1* | 8/2011 | Xu | G06F 3/02 |
| | | | | 345/169 |
| 2011/0244962 | A1* | 10/2011 | Kidakarn | A63F 13/245 |
| | | | | 463/36 |
| 2011/0306424 | A1* | 12/2011 | Kazama | A63F 13/98 |
| | | | | 463/37 |
| 2013/0059696 | A1* | 3/2013 | Hijmans | A63B 23/03525 |
| | | | | 482/8 |
| 2014/0200085 | A1* | 7/2014 | Bares | A63F 13/98 |
| | | | | 463/47 |
| 2016/0249718 | A1* | 9/2016 | Oh | H04M 1/04 |
| | | | | 455/575.6 |
| 2017/0153084 | A1 | 6/2017 | Tarazi | |
| 2019/0015739 | A1* | 1/2019 | May | A63F 13/211 |
| 2019/0155404 | A1* | 5/2019 | Cutrell | A63F 13/285 |
| 2020/0147482 | A1* | 5/2020 | Green | A63F 13/90 |
| 2020/0269130 | A1* | 8/2020 | Provancher | A63F 13/98 |
| 2020/0276488 | A1* | 9/2020 | Cottam | G16H 40/63 |

OTHER PUBLICATIONS

Wired, How Oculus Designed Its Touch VR controller Wired, https://www.youtube.com/watch?v=5yfRPbH1dh8 , time 0:00-3:48, p. 1 (Year: 2016).*

International Search Report (with English translation) and Written Opinion (with Machine translation) dated Jun. 12, 2019 in corresponding International Application No. PCT/FR2019/050694; 17 pages.

The Protubevr Team, "Kit assembly tutorial", Feb. 6, 2018, Retrieved from the Internet: https://docs.wixstatic.com/ugd/92fad4_67798185e84a44eaa4b06cf0e571e0c0.pdf Retrieved on Dec. 21, 2018, 4 pages.

MRTV—Mixed Reality TV, "Maximum Immersion: ProtubeVR Review—VR Rifle for Samsung Odyssey / Windows MR / Vive / Rift", Feb. 20, 2018, Retrieved from the Internet: https://www.youtube.com/watch?v=-8dMK-Z6ugA Retrieved on Jan. 3, 2019, Screen shots 3 sheets.

* cited by examiner

CONTROLLER SUPPORT FOR VIRTUAL REALITY VIDEO GAMES

FIELD

The invention aims for a controller support for virtual reality video games. It also aims for a device for attaching a controller for virtual reality video games.

It relates to the technical field of accessories for virtual reality video games, making it possible to make game experiences even more immersive, in particular but not exclusively for three-dimensional (3D) shooting games.

BACKGROUND

An immersive virtual environment comprises stimuli sources, making it possible for a user to have the feeling of being completely immersed in the virtual environment of the video game.

Virtual reality headsets make it possible for the user to be immersed in a virtual scene of a video game, for example, by moving their head and their face, by making certain movements and by possibly moving in a limited radius.

A virtual reality headset is presented in the form of a mask covering the eyes of the user. A screen and lenses are placed a few centimeters opposite the eyes to display virtual images. Various sensors make it possible to detect the head and face movements of the user, which makes it possible to adapt, in real time, the image projected on the screen, in order to produce the illusion of an immersion in the returned scene. These headsets are, for example, commercialized under the brands HTC VIVE®, OCULUS RIFT®, LENOVO®, or SAMSUNG ODYSSEY®.

In 3D shooting games, the image of a target or of an enemy displayed on the screen of the headset must be hit by a bullet. The targeting of the target and the shot is made by means of at least one controller held by the player. These controllers generally operate in pairs, one in each hand of the user.

These controllers generally comprise a joystick or touchpad for the movements of the player in the virtual environment, one or more buttons and/or triggers making it possible to trigger actions in this environment and in particular, the position/placement of objects, shooting, aiming, firing, etc. Different movement and/or position sensors are arranged on a ring secured to the stick of the controller. They are, for example, commercialized by the company OCULUS® under the brand OCULUS TOUCH® or by the company VIVE®. Patent documents USD780807, US2017262048 or also US2016361637 also disclose this type of controller.

Controllers are monitored in the space by means of different sensors/transmitters (arranged on the controllers and/or the headset and/or in the room where the game takes place), such that the user can interact with the virtual environment by themselves. Various techniques make it possible to synchronize the images projected on the screen of the headset with the position of the controllers. These techniques do not form the subject of the present invention and will therefore not be described here. It is the same for techniques of transmitting data between the headset, the controllers and the central unit making it possible for the implementation of the video game.

The handling of controllers during a game significantly affects the experience of the game insofar as the players are bound to play with speed and precision with respect to an action. Each detail which returns to the brain of the player that this is virtual reality, is likely to interfere with their feeling of immersion and their experience. If current controllers make it possible to effectively simulate the holding of an object in each hand (for example, a handgun, a knife, a stick, etc.), the result is not as good, as soon as this simulates the holding of an object which is held with both hands (for example, as assault rifle, a sword, a golf club, a fishing rod, etc.).

In the field of shooting games, complex and expensive reproductions of assault rifles are known, such as those described in patent document EP1900404 or those commercialized under the brands DELTA SIX® or STRIKER VR®.

However, in a virtual reality environment, the player does not see what they have in their hands. One single support making it possible to hold the two controllers in an alignment seems fully sufficient. This type of support is today commercialized by the applicant under the brand ProTubeVR® (https://www.protubevr.com). This support is presented in the form of a stick which can be gripped with two hands, which simulates, for example, a gun in the virtual reality video game. Two housings secured to the gun are adapted to each receive a controller by interlocking. Each controller housing is secured to the stick by way of an articulated pin enabling a rotation of said housing with respect to the axis of said stick. The player has the feeling of holding the trigger of a gun in one hand and the barrel in the other. During the game, the impression of holding a virtual weapon is actually real and the player benefits from an optimal shooting precision.

Certain games regularly demand to independently use the two controllers thereof for different types of actions such as recharging the weapon thereof, speaking on the radio, throwing objects or also interacting with other players. As many interactions which demand the player to remove at least one controller from the housing thereof, then to replace it there. With the current ProTubeVR® support, the housing remains attached to the stick. The controller is removed from the housing by a movement upwards. Putting the controller back in place in the housing is done by an inverse movement downwards. These up/down movements are not more intuitive for the player. Furthermore, upon the reinsertion of the controller in the housing, the difficulty of finding the original haphazard position is added (the player with the virtual reality headset in front of their eyes), which is likely to lose sometimes precious time under the fire of the action.

Controller supports commercialized by the company MAMUT® (http://mamutvr.com) or commercialized under the name MAGNETIC VIVE RIFLE VR (accessible, for example, from the website https://www.etsy.com/fr/listing/491103695/htc-vive-magnetique-controleur-double) are known, wherein the controllers are attached by magnetization on the support. The controller is disconnected from the support by a movement frontwards, in the axis of said support. The magnetic connection includes a magnetized disc which is attached to the top of the ring of the controller and which engages with a magnetized or metal part attached under the support. This type of support has several disadvantages. The magnetized disc added to the controller has a significant weight likely to cause an imbalance frontwards. In addition, during the assembly of the controller on the support, all or some of the sensors positioned in the ring of the controller are hidden by said support. Also, the solution by magnetized disc on the ring is not compatible with all controller models, and does not suit, in particular, ACER®, LENOVO® or SAMSUNG controllers where the ring is not rigid enough to support the magnetized disc. Furthermore, this solution is not compatible with an articulation enabling the rotation of the controller.

SUMMARY

The invention aims to overcome the abovementioned technical problems. In particular, an aim of the invention is to propose a controller support making it possible to secure/disconnect a controller simply, rapidly and intuitively for the player.

Another aim of the invention is to propose a controller support facilitating the return to the original position of the controller after disconnection of it.

An additional aim of the invention is to propose a support, of which the design does not interfere with the signals received/transmitted by the sensors/transmitters integrated in the controller.

Also, another aim of the invention is to propose a support which is compatible with a large number of controller models.

Also, another aim of the invention is to propose a controller support, of which the design is simple, inexpensive and easy to use.

The solution proposed by the invention is a controller support for virtual reality video game, including:
a stick,
at least one grippable housing adapted to receive a controller by interlocking,
the controller housing is secured to the stick.
This support is noteworthy in that:
the controller housing is secured to the stick by way of a pin,
the controller housing is configured to be removably engaged on the pin,
a magnetic connection exerting a magnetic force ensures the holding in position of the controller housing on the pin,
the magnetic connection is configured such that the engagement/disengagement of the controller housing on the pin is carried out by a lateral movement of said housing, the magnetic force being oriented in the direction of this lateral movement.

Contrary to the ProTubeVR® solution known to date, it is now the controller+housing assembly which is handled by the player and which is engaged/disengaged from the pin. The inventor has observed that the lateral movement necessary for this operation is more natural and intuitive than a transversal movement from bottom to top, and due to this, more rapid.

Other advantageous features of the invention are listed below. Each of these features can be considered individually or in combination with the noteworthy features defined above, and form the subject, if necessary, of one or more divisional patent applications:

Advantageously, the direction of the magnetic force is normal to the sagittal median plane of the stick or oriented according to a solid angle less than or equal to 0.5 steradian, the axis of this solid angle being normal to said sagittal median plane.

The controller housing can include a magnetized portion, respectively a metal portion, engaging with a metal portion, respectively magnetized, arranged on the pin.

Preferably, the controller housing includes a magnetized portion engaging with another magnetized portion arranged on the pin.

Advantageously, the controller housing includes a reservation which covers a portion of the pin when said housing is engaged on said pin, which reservation is delimited by a side wall and a bottom wall.

The side wall of the reservation is preferably oriented in the direction of the lateral movement, making the engagement/disengagement of the controller housing possible, such that said side wall acts as a guiding of said housing during the engagement/disengagement thereof of the pin.

The magnetized portion of the controller housing is advantageously arranged at the level of the bottom wall.

Advantageously, the side wall of the reservation includes at least one surface which comes into contact with a complementary surface of the covered portion of the pin when said housing is engaged on said pin and when said housing is urged in the axis of the stick.

The pin can be mounted on an articulation enabling a rotation of the controller housing in a plane passing through the axis of the stick.

The stick can have at least two portions articulated together, each of said portions is provided with a controller housing mounted on an articulation.

The stick can include a crosier of which one portion is shaped so as to form a cheek support, which crosier is mounted on an articulation enabling a pivoting of said crosier with respect to the axis of said stick.

A connection by mechanical clipping can contribute to the holding in position of the controller housing on the pin.

Advantageously, the controller housing includes inner walls covered with a rubber or silicone coating.

The controller has a stick which could be provided with a strap adapted to be passed around the wrist of the player, the controller housing having a wall including a hole for the passage of said strap.

Another aspect of the invention relates to a device for attaching a controller for virtual reality video games, including:
a housing adapted to receive a controller by interlocking,
a pin on which the controller housing is secured,
the controller housing is configured to be removably engaged on the pin,
a magnetic connection exerting a magnetic force ensures the holding in position of the controller housing on the pin,
the magnetic connection is configured such that the engagement/disengagement of the controller housing on the pin is made by a lateral movement of said housing, the magnetic force being oriented in the direction of this lateral movement.

BRIEF DESCRIPTION OF THE DRAWINGS

Other advantages and features of the invention will appear better upon reading the description of a following preferred embodiment, in reference to the appended drawings, made as indicative and non-limiting examples and wherein.

DETAILED DESCRIPTION

Figure 1:
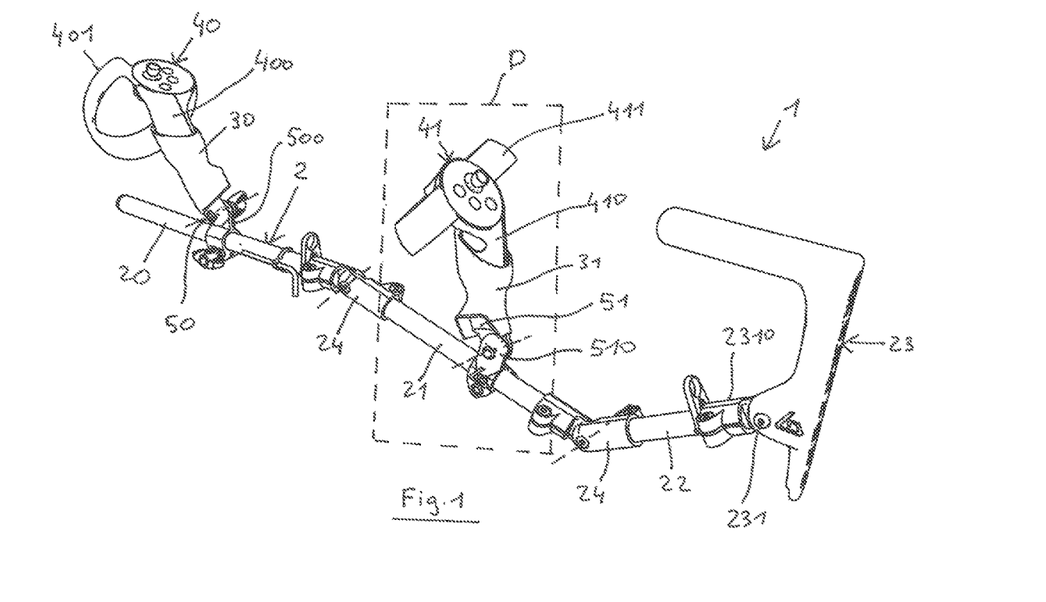
FIG. 1 is a left-side perspective view of a controller support according to the invention.
Figure 2:
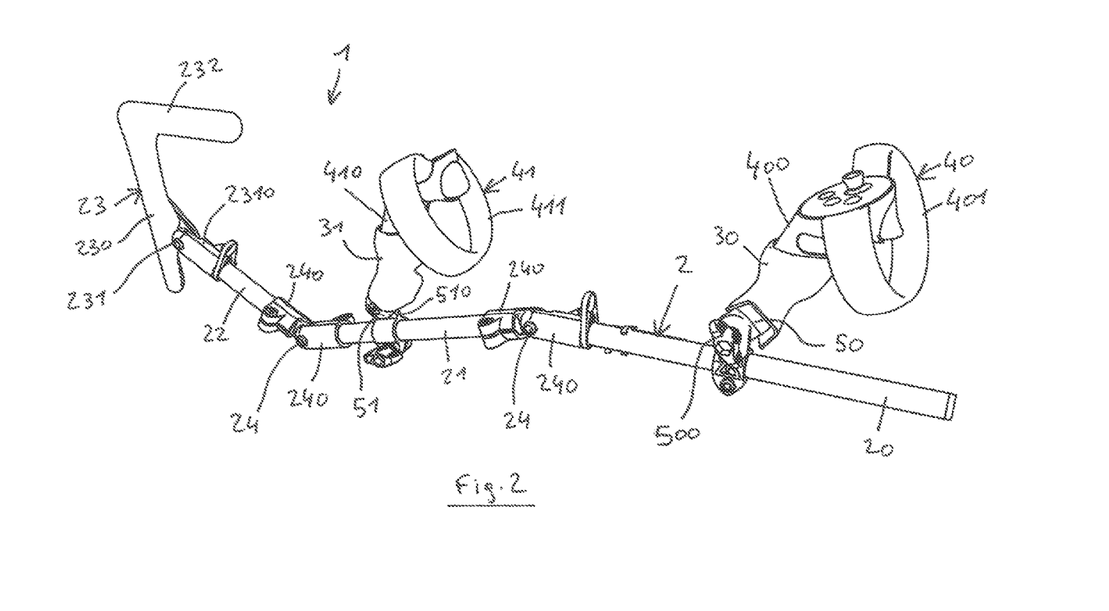
FIG. 2 is a right-side perspective view of the controller support according to FIG. 1.
Figure 3:
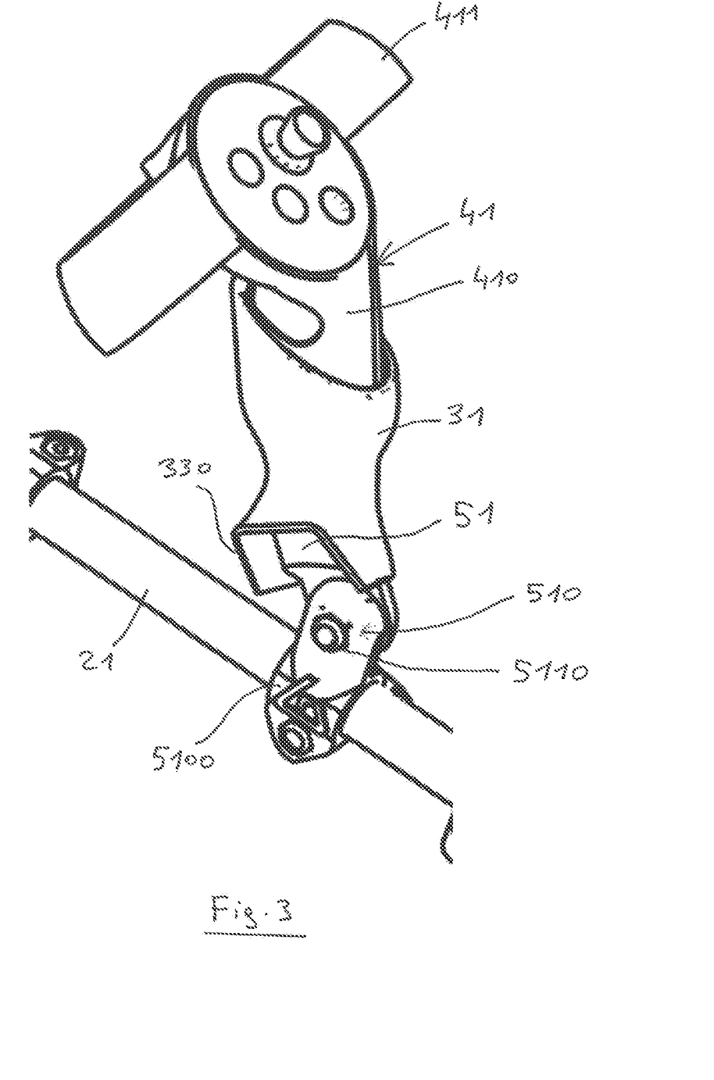
FIG. 3 is an enlarged view of the detail D of FIG. 1.

By referring to FIGS. 1 and 2, the controller support 1 which is the subject matter of the invention is presented in the form of a stick. This stick 2 simulates an object in the virtual environment of the video game, in particular a gun, but also other objects such as a handgun, sword, stick, golf club, fishing rod, etc. In other words, the stick 2 forms a virtual simulated object.

The stick 2 can be straight, curved or be presented in the form of a broken line. It has the function, in particular, of physically connecting the controllers together and to hold them in a certain alignment.

Figure 8:
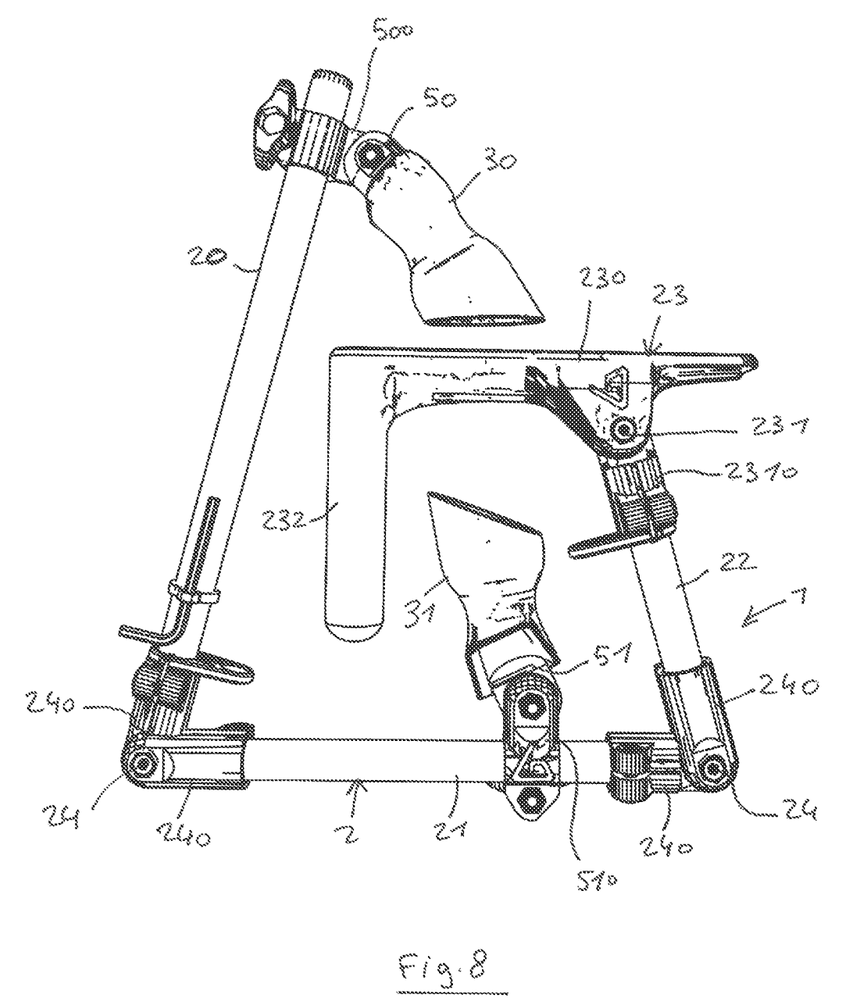
FIG. 8 shows a controller support according to the invention in a folded state.

According to a preferred embodiment illustrated in FIGS. 1 and 2, the stick 2 has four portions 20, 21, 22, 23 articulated together: a front portion 20, a middle portion 21, a rear portion 22 and a crosier 23. An advantage linked to the use of an articulated stick 2 is that this can be easily folded (FIG. 8), and that in this folded state, the support 1 has a reduced bulk, such that it can be easily stored and/or transported. Furthermore, the player has the possibility to shape the stick 2 to adapt it to the morphology thereof, and/or to the virtual simulated object type used in the video game.

The front 20, middle 21 and rear 22 portions are presented advantageously in the form of rigid tubes, made of metal, plastic, wood, carbon, etc. The tubes can be cylindrical, of round, oval, square, rectangular cross-section, etc. The length thereof is, for example, comprised between 15 cm and 30 cm and the outer diameter thereof, for example, comprised between 1 cm and 5 cm. These portions can have the same length or different lengths. In FIGS. 1 and 2, the rear portion 22 is, for example, shorter than the front 20 and middle 21 portions.

The portions 20, 21 and 22 are advantageously connected together by means of articulated tube connectors 24 with two junctions 240. These connectors 24 each form a pivot connection of horizontal axis. The articulations of the connectors 24 are preferably notched, such that the player can adjust the shaping of the stick 2 suitably, then block in position the portions 20, 21 and 22 once the shaping is done.

The crosier 23 can be made of the same material as the articulated portions 20, 21, 22, 23 or made of a different material. To simplify the design thereof, it is obtained by plastic molding. In FIGS. 1 and 2, this crosier 23 has a general L-shape, of which one branch 230 is mounted on an articulation 231. The other branch 232 is oriented in the same direction as the stick 2, towards the front portion 20. The branch 232 forms a cheek support, particularly useful for the player when they want to adjust a shot.

The articulation 231 forms a pivot connection of horizontal axis enabling a rotation of the crosier 23 with respect to the axis of the stick 2. By "axis of the stick", this means here the longitudinal axis of the stick 2 when this is rectilinear, or the longitudinal axis of the rear portion 22 when said stick is not rectilinear. The articulation 231 is presented preferably in the form of a notched articulation including a portion 2310 wherein an end of the rear portion 22 is fixedly interlocked. The notching makes it possible for the player to adjust the inclination of the crosier 23 suitably, then to block it in position once this adjustment is carried out.

The support 1 is provided with two housings 30, 31 adapted to each receive a controller 40, 41. These housings 30, 31 can be made of metal, plastic, carbon, etc. In the appended figures, they are arranged on the front 20 and middle 21 portions of the stick 2.

Figure 7:
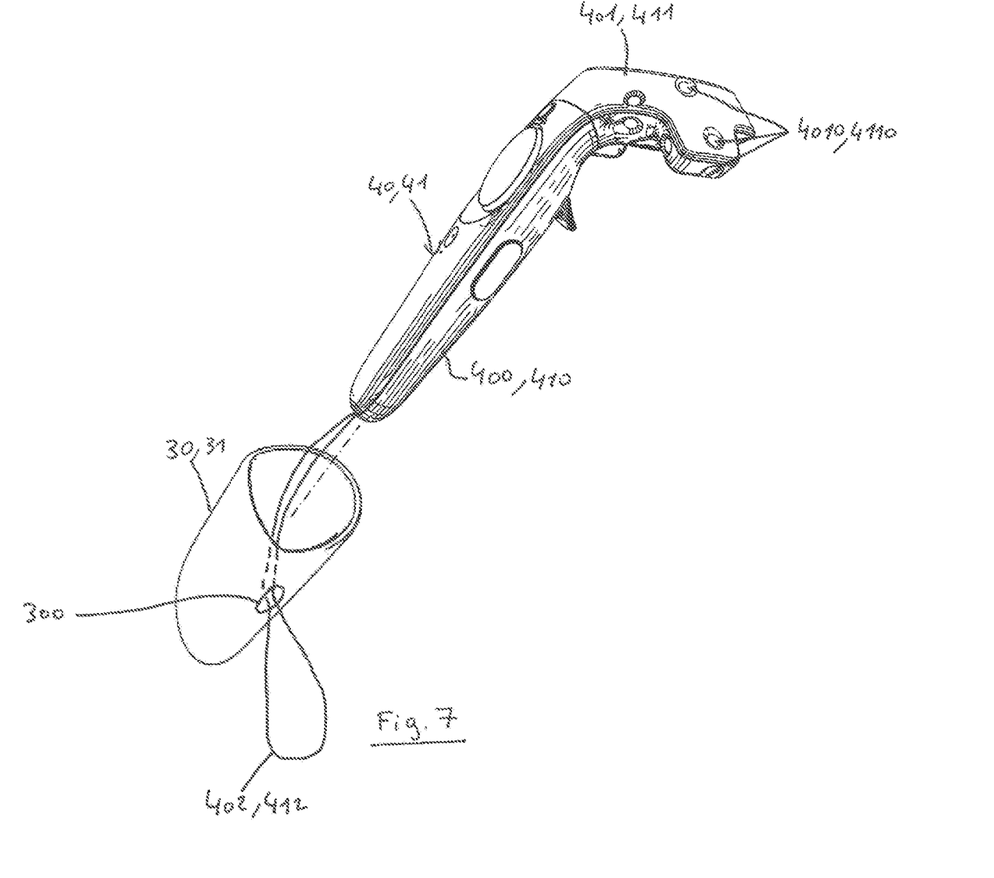
FIG. 7 illustrates an example of interlocking a controller in a controller housing.

By referring, in particular, to FIG. 7, the controller 40, 41 includes a stick 400, 410 at the end of which is arranged a ring 401, 411 supporting the sensors/transmitters 4010, 4110.

Each housing 30, 31 has the shape of a goblet or cup wherein the stick 400, 410 of the controller 40, 41 is interlocked. This interlocking is done along the axis of the stick 400, 410, and generally according to a movement from the top to the bottom. The inner dimensions of the housing 30, 31 are adjusted to those of the stick 400, 410 such that the stick 400, 410 is held in position quite firmly. The inner dimensions of the housing 30, 31 are adapted to the controller model used by the player (VIVE®, OCULUS RIFT®, ACER®, LENOVO®, and SAMSUNG®, HP®, DELL®), such that the stick 400, 410 is engaged with a clamped adjustment in said housing 30, 31. Therefore, a specific housing can be provided by controller model. To improve the holding in position of the stick 400, 410 in the housing 30, 31, the inner walls of the latter are advantageously covered with a coating of the rubber or silicone type, ensuring an additional adherence.

In FIG. 7, the stick 400, 410 is provided with a strap or hand strap 402, 412 adapted to be passed around the wrist of the player to avoid the controller 40, 41 falling if it is accidentally dropped during handling. To conserve this attachment when the stick 400, 410 is interlocked in the housing 30, 31, the wall of the latter includes a hole for the passage 300 of the strap 402, 412.

Each housing 30, 31 is secured to the stick 2 by way of a pin 50, 51. These pins 50, 51 protrude upwards from the stick 2 such that said stick is located positioned under the controllers 40, 41. The sensors/transmitters 4010, 4110 carried by the rings 401, 411 are thus perfectly discovered when the controllers 40, 41 are interlocked in the respective housing 30, 31 thereof, no element of the support 1 hiding them.

Each pin 50, 51 is preferably made of a non-magnetic material such as plastic, wood, carbon, etc. It can have a round, oval, square, rectangular cross-section, etc. The height thereof is, for example, comprised between 1 cm and 10 cm and the width/thickness thereof, for example, comprised between 0.5 cm and 5 cm.

Advantageously, each pin 50, 51 is mounted on an articulation 500, 510 enabling a rotation of the housing 30, 31 in a plane passing through the axis of the stick 2, and starting a rotation of the controller 40, 41. By "axis of the stick", this means here the longitudinal axis of the stick 2 when this is rectilinear or, when said stick is not rectilinear, the longitudinal axis of the portion 20, 21 on which is arranged the housing 30, 31. The player thus has the possibility to precisely adjust the inclination of each controller 40, 41, for example to optimize the precision of a shot.

Figure 4A:
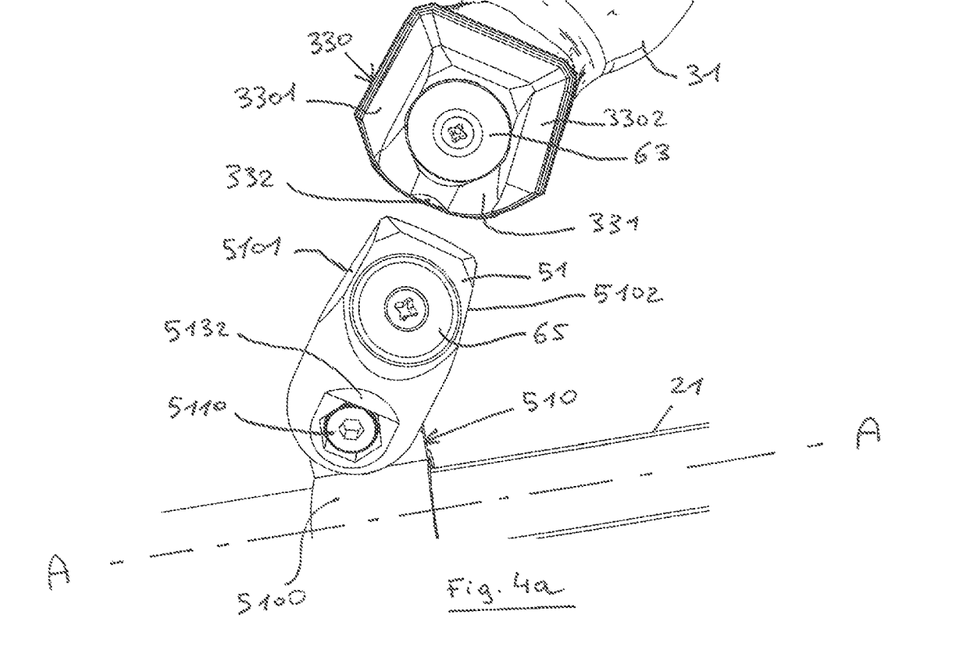
FIG. 4a shows in detail, a magnetic connection ensuring the holding in position of a controller housing on an articulation.
Figure 4B:
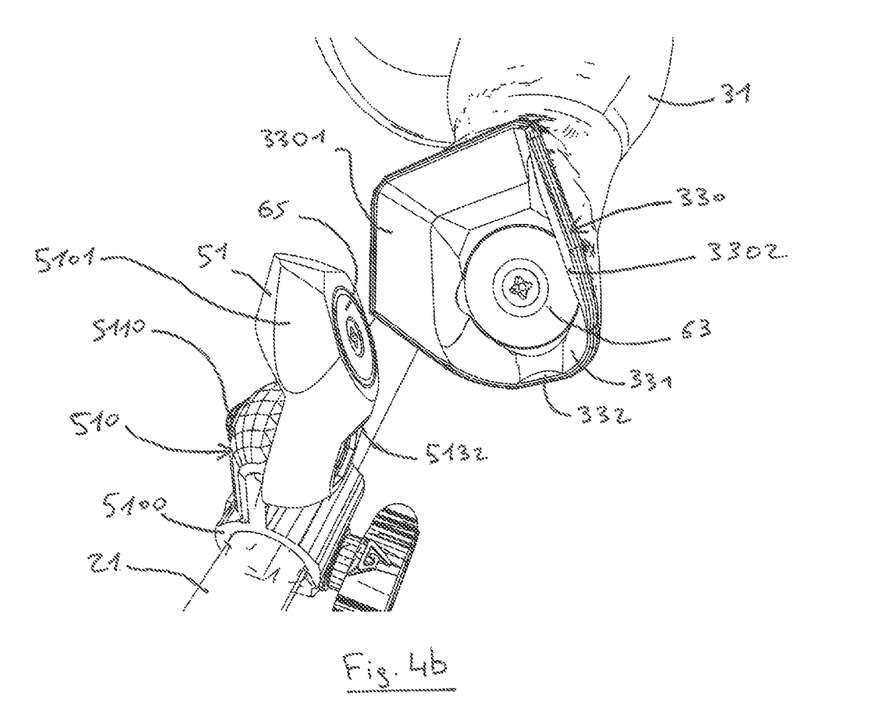
FIG. 4b shows in detail, a magnetic connection ensuring the holding in position of a controller housing on an articulation.

The mounting of a pin 51 on an articulation 510 clearly appears in FIGS. 4a and 4b, being understood that the mounting of the other pin 50 on the other articulation 500 is identical. The articulation 510 advantageously includes a clamping collar 5100 making it possible to hold it in position on the portion 21, with a possibility of angular articulation around the longitudinal axis of said portion. Also, the two articulations 500 and 510 are not necessarily aligned but can be off-center according to the adjustment needs of the player. The clamping collar 5100 is surmounted by a portion carrying the axis of rotation 5110. The latter is perpendicular or substantially perpendicular to the longitudinal axis of the portion 21. The axis of rotation 5110 is presented, for example, in the form of a rod or a screw also in contact with the pin 51.

A notched interface can be provided between the pin 51 and the articulation 510, such that the player can adjust the inclination of said pin (and therefore of the housing 31) suitably, then block it in position once this adjustment is made. Also, a notched articulation can be provided at the level of a pin and a smooth articulation at the level of the other pin. For example, by referring to FIGS. 1 and 2, the front articulation 500 can be smooth while the rear articulation 510 is notched. Such a configuration offers the player the possibility of modifying, at any time, the inclination of the front controller 40, for example to adapt it to a game sequence, while the other rear controller 41 remains with a fixed inclination. The two articulations 500, 510 can also both be smooth articulations.

According to a feature of the invention, the housings 30, 31 are grippable and are removably engaged on the pins 50, 51. To disengage a controller 40, 41 of the stick 12, the player must therefore handle it by holding the housing wherein it is interlocked, which housing is thus substituted for the stick 400, 410 of said controller. To improve the gripping of the housings 30, 31, the outer wall thereof can be shaped ergonomically to be adapted to the player's hand.

The inventor has observed that a lateral movement of the housing 30, 31 to engage/disengage the stick 40, 41 of the stick 2 was a lot more natural and intuitive for the player, than a transversal movement from bottom to top or from top to bottom, like with MAMUT®, MAGNETIC VIVE RIFLE VR or ProTubeVR® supports known to date.

Figure 5:
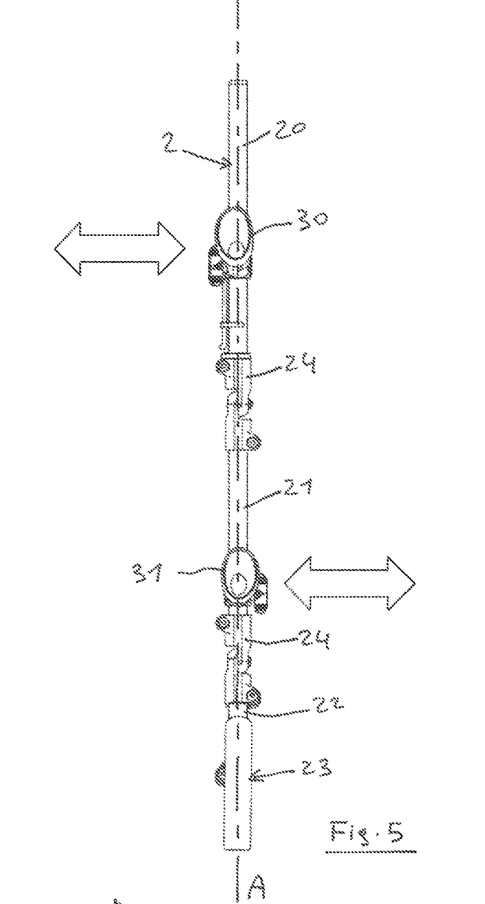
FIG. 5 is a top view of a support according to the invention, the controllers not being represented.
Figure 6:
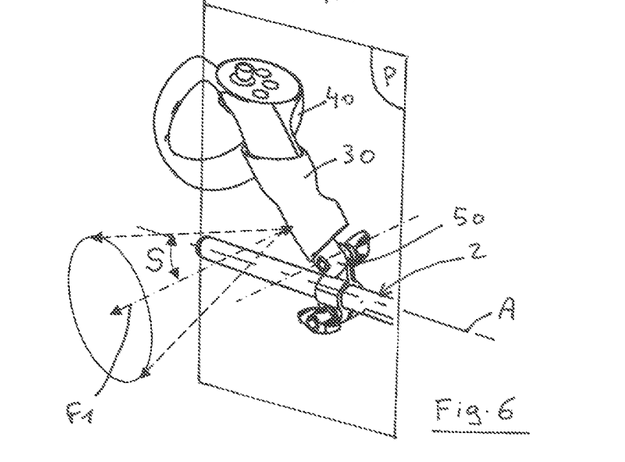
FIG. 6 illustrates lateral movements for the engagement/disengagement of a housing on the pin thereof.

FIG. 5 shows a support 1 as a top view, the plane of the drawing board corresponding to the transversal plane of the stick 2. The lateral movement of the housings 30, 31 is a side movement with respect to the axis A-A of the stick 2, which side lateral movement is illustrated by double arrows. The player must hold the housing 30, 31 and carry out a lateral translation and/or rotation of their hand or of their forearm to engage/disengage it from the pin thereof. By referring to FIG. 6, this lateral movement can be done perpendicularly to the sagittal median plane P of the stick 2 (according to the arrow F1) or according to a solid angle 'S' less than or equal to 0.5 steradian (Pi/6 for an equivalent plane angle), the axis of this solid angle being normal to the sagittal median plane P of said stick.

FIG. 5 illustrates a configuration for a right-handed player, where the player holds the front housing 30 with the left hand and the rear housing 31 with their right hand. The most natural and intuitive movement for the player consists of disengaging the front housing 30 by carrying out a movement from right to left and to reengage by a movement from left to right. Conversely, the rear housing 31 is disengaged by carrying out a movement from left to right and reengaged by a movement from right to left.

A left-handed player will hold the front housing 30 with their right hand and the rear housing 31 with their left hand. The most natural and intuitive movement for this player consists of disengaging the front housing 30 by carrying out a movement from left to right and to reengage it by a movement from right to left. The rear housing 31 will be disengaged by carrying out a movement from right to left and reengaged by a movement from left to right.

Preferably, it is a magnetic connection exerting a magnetic force which ensures the holding in position of the housing 30, 31 on the pin 50, 51. Thus, a connection is obtained by "magnetic clipping". This magnetic connection is configured such that the engagement/disengagement of the housing 30, 31 on the pin 50, 51 is carried out by a lateral movement of said housing, the magnetic force being oriented in the direction of this lateral movement, i.e. according to the arrows illustrated in FIGS. 5 and 6. The direction of the magnetic force is therefore normal to the sagittal plane P of the stick 2 or oriented according to the abovementioned solid angle 'S'.

In practice, when the player has a virtual reality headset covering their eyes, a controller 40, 41 held in one hand and disconnected from the stick 2, it comes to find, quite intuitively, the approximate position of the pin 30, 31. Once near the pin 50, 51, it is the magnetic force which will finish guiding the housing 30, 31 towards said pin. The magnetic connection therefore has two functions: ensuring the holding in position of the housing 30, 31 on the pin 50, 51; and directing the housing 30, 31 in a determined return direction when it is in the proximity of said pin 50, 51.

In FIGS. 4a and 4b, the housing 31 includes a magnetized portion 63 engaging with a metal portion 65 arranged on the pin 51. An inverse configuration can be considered where the housing 31 includes a metal portion 63 engaging with a magnetized portion 65 arranged on the pin 51. The best results are obtained when the housing 30, 31 and the pin 50, 51 both include a magnetized portion which engage together. Preferably, permanent magnets are used, each exerting a force equivalent to about 11 kg (the equivalent of the force (weight) exerted by a mass of about 11 kg in the average field of the Earth's gravity). This type of magnet is a good compromise between an effective adherence of the housing 30, 31 on the pin 50, 51; an easy disengagement of the housing 30, 31 by a lateral movement; and a good magnetic guidance during the reengagement phase of the housing 30, 31 on the pin 50, 51.

In FIGS. 4a and 4b, the housing 31 has a reservation delimited by a side wall 330 and a bottom wall 331. This bottom wall 331 is preferably situated in a plane parallel to the sagittal median plane P of the stick 2 and/or in a plane perpendicular to the direction of the magnetic force. The side wall 330 has a U-shaped or C-shaped cross-section. The side wall 330 thus covers the upper portion of the pin 51 when said housing is engaged on said pin. The pin 51, and in particular the upper portion thereof, has a complementary shape of the reservation of the housing 31 so as to ensure an adjusted interlocking of these two elements.

The side wall 330 is oriented in the direction of the lateral engagement/disengagement movement of the housing 31 on the pin 51. It thus acts as a guide during engagement/disengagement phases of the housing 31. This guiding is improved when the side wall 330 is flared, i.e. which goes by enlarging from the bottom wall 331. The side wall 330 thus has the general shape of a three-sided frustum of pyramid.

During particularly active game sequences, it can occur that the player suddenly urges the controllers 40, 41 assembled on the stick 2. It is, for example, the case during a shooting game sequence where numerous enemies must be eliminated rapidly or during a fishing game sequence where the player must fire on their fishing rod to hit a fish outside of the water. In this type of sequence, the controllers 40, 41 are generally urged in the axis of the stick 2, by a sudden front/rear movement. To not impede the virtual experience of the player, it is important that the housings 30, 31 are not disconnected from the pins 50, 51 following these sudden movements. To do this, and as illustrated in FIGS. 4a and 4b, the side wall 330 includes at least one, preferably two active surfaces 3301, 3302, which each come into contact with a complementary surface 5101, 5102 of the covered portion of the pin 51, 52 when said housing is engaged on said pin and when said housing is urged in the axis of the stick 2. In the embodiment of FIG. 4a, the active surface 3301 comes into contact with the active surface 5101 when the housing 31 is urged in the axis A-A of the stick 2, towards the right of the drawing board, and the opposite active surface 3302 comes into contact with the complementary active surface 5102 when the housing 31 is urged in the axis A-A of the stick 2, towards the left of the drawing board.

Thus shaped, the reservation of the housing 31 and the portion of the pin 51 which is covered by this reservation, form stop elements which come into contact when said housing is engaged on said pin and which engage when said housing is urged in the axis A-A of the stick 2. However, these stop elements do not engage when the housing 31 is urged laterally, so as to enable the engagement/disengagement of said housing.

When these stop elements come into contact and engage, they make it possible also for the player to transmit the pair making it possible to adjust the inclination of a pin 50 and/or 51 when this is mounted on an articulation 500, 510.

In FIGS. 4a and 4b, the magnetized portion 63 arranged on the housing 31 is arranged at the level of the bottom wall 331 and held on the latter by screwing or gluing. The magnetized portion 65 arranged on the pin 51 is itself arranged at the level of a side wall of said pin, which side wall is opposite the bottom wall 331 when the housing 31 is engaged on said pin. The magnetized portion 65 is also held on the wall of the pin 51 by screwing or gluing.

Figure 9A:
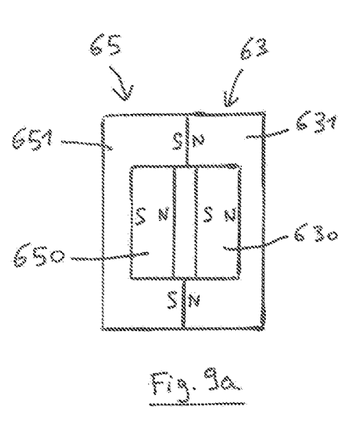
FIG. 9a illustrates an example of magnetic connection in an assembled state.
Figure 9B:
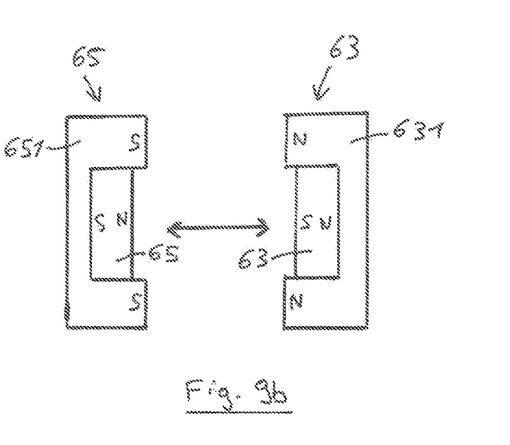
FIG. 9b illustrates the magnetic connection of FIG. 9a in a disassembled state.

According to an advantageous feature of the invention illustrated in FIGS. 9a and 9b, the magnetized portions 63 and 65 are each presented in the form of a potted magnet. In this type of mounting, the magnet 630, 650 (having North 'N' and South 'S' poles) is inserted inside a steel cup 631, 651 forming a "pot". The poles of the magnets 630, 650 are inverted so as to generate an attraction force of the magnetized portions 63 and 65. When the magnetized portions 63, 65 are in contact with one another (FIG. 9a), the edges of the cups 631, 651 are in contact, the magnets 630, 650 could be in slight withdrawal from these edges such that they are not in direct contact. The cups 631, 651 all deviate the lines of the magnetic field in the direction of the contact surface. The magnetic force is thus concentrated on the contact surface, which actually improves the adherence of the housing 30, 31 on the pin 50, 51. Furthermore, the inventor has observed that these potted magnets would contribute to a self-centering of the housing 30, 31 on the pin 50, 51.

By referring to FIGS. 4a and 4b, the reservation of the housing 31 has a lug 332 which projects from the bottom wall 331. This lug 332 is situated at the level of the free side of the bottom wall 331, i.e. the side with no side wall 330. The lug 332 is configured to be engaged against an active surface 5132 of the pin 51, when the housing 31 is engaged on the latter. The engagement of the lug 332 and of the active surface 5132 makes it possible to finalize the self-centering of the housing 30, 31 on the pin 50, 51.

The lug 332 and the active surface 5132 can also form a connection by mechanical clipping contributing to the holding in position of the housing 30, 31 on the pin 50, 51. This connection by mechanical clipping complements the connection by magnetic clipping described above. In an embodiment variant not covered by the invention, the holding in position of the housing 30, 31 on the pin 50, 51 is only endured by this connection by mechanical clipping.

The arrangement of the different elements and/or means and/or steps of the invention, in the embodiments described above, must not be comprised as requiring such an arrangement in all the implementations. In any case, it will be understood that various modifications can be applied to these elements and/or means and/or steps, without deviating from the sense and the scope of the invention. In particular:

The stick 2 can be simply one single holding, without articulation, or only include two articulated portions, including the rear crosier.

One single housing 30 or 31 can be secured to the stick 2.

The pins 50, 51 can be made of metal or steel.

Each pin 30, 31, or only one of them, can be fixedly mounted on the stick 2, i.e. without possibility of rotation, for example by screwing or welding.

Only one of the two housings 30, 31 can be removably engaged on the pin 50, 51 thereof, the other housing being fixedly mounted on the pin thereof, i.e. without possibility of disengagement during the game.

The side wall 330 of the reservation arranged in the housing 30, 31 can have the general shape of a cone frustum, or any other shape suitable for a person skilled in the art, the pin 51 or at least one portion of it thus having a complementary shape of this reservation.

The invention claimed is:

1. A controller support for virtual reality video games, comprising: a stick having a shaft, wherein the stick has a longitudinal axis along the entirety of the shaft or having a portion comprising a longitudinal axis along the entirety of the shaft, and at least one grippable housing adapted configured to receive a game controller by interlocking, the controller housing is secured to the stick, wherein the controller housing is secured to the stick or to the stick's portion by way of a pin, the controller housing is configured to be removably engaged on the pin, a magnetic connection exerting a magnetic force ensures the holding in position of the controller housing on the pin, the magnetic connection is configured such that the engagement/disengagement of the controller housing on the pin is done by a lateral movement of said housing, the lateral movement of the housing is in a perpendicular direction with respect to the longitudinal axis, the magnetic force being oriented in the direction of this lateral movement.

2. The controller support according to claim 1, wherein the direction of the magnetic force is normal to the sagittal median plane of the stick or oriented according to a solid angle less than or equal to 0.5 steradian, the axis of this solid angle being normal to said sagittal median plane, said sagittal median plane including the longitudinal axis.

3. The controller support according to claim 2, wherein the controller housing includes a magnetized portion, respectively a metal portion, engaging with a metal portion, respectively magnetized, arranged on the pin.

4. The controller support according to claim 2, wherein the controller housing includes a magnetized portion engaging with another magnetized portion arranged on the pin.

5. The controller support according to claim 1, wherein the controller housing includes a magnetized portion, respectively a metal portion, engaging with a metal portion, respectively magnetized, arranged on the pin.

6. The controller support according to claim 1, wherein the controller housing includes a magnetized portion engaging with another magnetized portion arranged on the pin.

7. The controller support according to claim 1, wherein the controller housing includes a reservation which covers a portion of the pin when said housing is engaged on said pin, which reservation is delimited by a side wall and a bottom wall.

8. The controller support according to claim 7, wherein the side wall of the reservation is oriented in the direction of the lateral movement making it possible for the engagement/disengagement of the controller housing, such that said side wall acts as guiding for said housing during the engagement/disengagement thereof of the pin.

9. The controller support according to claim 8, wherein the controller housing includes a magnetized portion, respectively a metal portion, engaging with a metal portion, respectively magnetized, arranged on the pin, and wherein the magnetized portion of the controller housing is arranged at the level of the bottom wall.

10. The controller support according to claim 8, wherein the controller housing includes a magnetized portion engaging with another magnetized portion arranged on the pin and the magnetized portion of the controller housing is arranged at the level of the bottom wall.

11. The controller support according to claim 7, wherein the controller housing includes a magnetized portion, respectively a metal portion, engaging with a metal portion, respectively magnetized, arranged on the pin, and the magnetized portion of the controller housing is arranged at the level of the bottom wall.

12. The controller support according to claim 7, wherein the side wall of the reservation includes at least one surface which comes into contact with a complementary surface of the covered portion of the pin when said housing is engaged on said pin and when said housing is urged in the axis of the stick.

13. The controller support according to claim 7, wherein the controller housing includes a magnetized portion engaging with another magnetized portion arranged on the pin, and wherein the magnetized portion of the controller housing is arranged at the level of the bottom wall.

14. The controller support according to claim 1, wherein the pin is mounted on an articulation enabling a rotation of the controller housing in a plane passing through the axis of the stick.

15. The controller support according to claim 1, wherein the stick has at least two portions articulated together, each of said portions is provided with a controller housing mounted on an articulation.

16. The controller support according to claim 1, wherein the stick includes a crosier of which one portion is shaped so as to form a cheek support, which crosier is mounted on an articulation enabling a pivoting of said crosier with respect to the axis of said stick.

17. The controller support according to claim 1, wherein a connection by mechanical clipping contributes to the holding in position of the controller housing on the pin.

18. The controller support according to claim 1, wherein the controller housing includes inner walls covered with a rubber or silicone coating.

19. The controller support according to claim 1, wherein the controller has a stick provided with a strap configured to be passed around the wrist of the player, the controller housing having a wall including a hole for the passage of said strap.

* * * * *